(12) United States Patent
Buchmann et al.

(10) Patent No.: US 7,853,616 B2
(45) Date of Patent: Dec. 14, 2010

(54) ACTIVE SEQUENCING

(75) Inventors: Daniel Buchmann, Eggenstein-Leopoldshafen (DE); Uwe E. Fischer, Karlsruhe (DE); Jochen Hoenig, Oehringen (DE)

(73) Assignee: SAP AG, Walldorf (DE)

( * ) Notice: Subject to any disclaimer, the term of this patent is extended or adjusted under 35 U.S.C. 154(b) by 401 days.

(21) Appl. No.: 11/803,563

(22) Filed: May 14, 2007

(65) Prior Publication Data

US 2008/0288472 A1    Nov. 20, 2008

(51) Int. Cl.
*G06F 17/20* (2006.01)
*G06F 15/16* (2006.01)

(52) U.S. Cl. .................. 707/791; 707/799; 719/314
(58) Field of Classification Search ............. 707/791, 707/799, 999.01; 719/314
See application file for complete search history.

(56) References Cited

U.S. PATENT DOCUMENTS 7,509,650 B2 * 3/2009 Dinh et al. ............... 719/314
2005/0193041 A1 * 9/2005 Bourbonnais et al. ....... 707/204

* cited by examiner

*Primary Examiner*—Jean B. Fleurantin
*Assistant Examiner*—Alex Gofman
(74) *Attorney, Agent, or Firm*—Mintz, Levin, Cohn, Ferris, Glovsky & Popeo, P.C.

(57) ABSTRACT

Methods and apparatus, including computer program products, are provided for processing messages including structured data, such as objects and business objects. The method may include a receiver inhibiting processing of a first message including a first object referencing a second object, when the receiver of the first message does not include key mapping information for the second object. The receiver may then receive key mapping information determined for the second object, when a second message, received at the receiver, includes the second object without references to another dependent object. The mapping information may be representative of a location of the second object. The receiver may then automatically resume processing of the first message, when the key mapping information is received. Related apparatus, systems, methods, and articles are also described.

9 Claims, 6 Drawing Sheets

ACTIVE SEQUENCING

FIELD

The present disclosure generally relates data structures, and more particularly, data structures used in business applications, such as databases.

BACKGROUND

In a client-services architecture, a client system, such as a computer, may call an application, such as a program, a service, or a web service, at a server to interact with the application through the Internet or an intranet. A service, such as a web service, is an application (or program) that makes itself available over the Internet or an intranet, uses standardized messaging, such as XML (extensible Markup Language) and Simple Object Access Protocol (SOAP), and uses some type of location mechanism, such as UDDI (Universal Description, Discovery, and Integration), to locate the service and its public Application Program Interface (API).

To call a service through the Internet or intranet, the client system makes a call (e.g., using messages) through an API, which defines the way the client communicates with the service. The service instantiates objects, such as business objects, in response to the API call. The term "object" refers to a data structure including at least one of data and related methods, while the phrase "business object" refers to an object used in connection with a business process or task.

An example of a service is a "catalog" service, which can be called through the Internet by a client system. The catalog service may allow a user at a client system to view and purchase products. FIG. 5 depicts some of the business objects that may be associated with the catalog service. The business objects may, for example, correspond to data listing each product (e.g., business object 402), product descriptions 404, available quantity 406 (e.g., quantity of products available in stock), and quantity ordered 408. In the example of FIG. 5, business objects 404-408 are so-called "dependent" business objects since they depend from business object 402.

When a client system calls the catalog service, the catalog service instantiates business objects 402-408, allowing objects 402-408 to retrieve from a database, data and methods associated with those objects. The retrieved data may then be buffered for the transaction with the client system. At some point (e.g., during or after the transaction), the business objects would be saved in a database 196 for persistent storage.

In some instances, business objects 402-408 may need to be sent, received, copied, replicated, updated, or transferred from database 196 to another database (or persistence mechanism). However, in many cases, business objects 402-408 cannot simply be sent from, for example, one database to another database because the size and complexity of real-world business objects may result in errors at the receiving and sending applications (e.g., database applications). There thus continues to be a need to provide mechanisms to send, receive, copy, replicate, update, and/or transfer business objects among applications.

SUMMARY

The subject matter disclosed herein provides methods and apparatus, including computer program products, for processing messages including structured information, such as objects and/or business objects.

In one aspect, there is provided a computer-implemented method for processing messages. The method may include a receiver inhibiting processing of a first message including a first object referencing a second object, when for the receiver of the first message no key mapping information for the second object is available. The receiver may then receive key mapping information determined for the second object, when a second message, received at the receiver, includes the second object without references to another dependent object. The key mapping information may be representative of a location of the second object. The receiver may then resume processing of the first message, when the key mapping information is received.

Variations may include one or more of the following features. The receiver may store the first message to enable resumption of processing of the first message. The first object may be implemented as at least one of a business object and a data structure. The receiver may be implemented as middleware associated with a first application sending the first message and a second application. The second application may have access to the first and second objects at the receiver. The second application may determine key mapping information for the second object. The key mapping information may be stored in a repository at the receiver. The key mapping information may also be representative of the location of the second object. The receiver may retrieve key mapping information for the first object. An indication that the receiver lacks key mapping information for the second object of the first message may be stored. A trigger may be established to enable resumption of processing of the first message, when the receiver receives the key mapping information corresponding to the indication. One or more messages may be rejected by the receiver until the trigger is activated, when key mapping information is received for the second object.

The subject matter described herein may be implemented to realize the advantage of faster transfers (e.g., replication, moves, and the like) of structured information among applications. Moreover, the receiving application or system need not have prior knowledge regarding the structured information.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
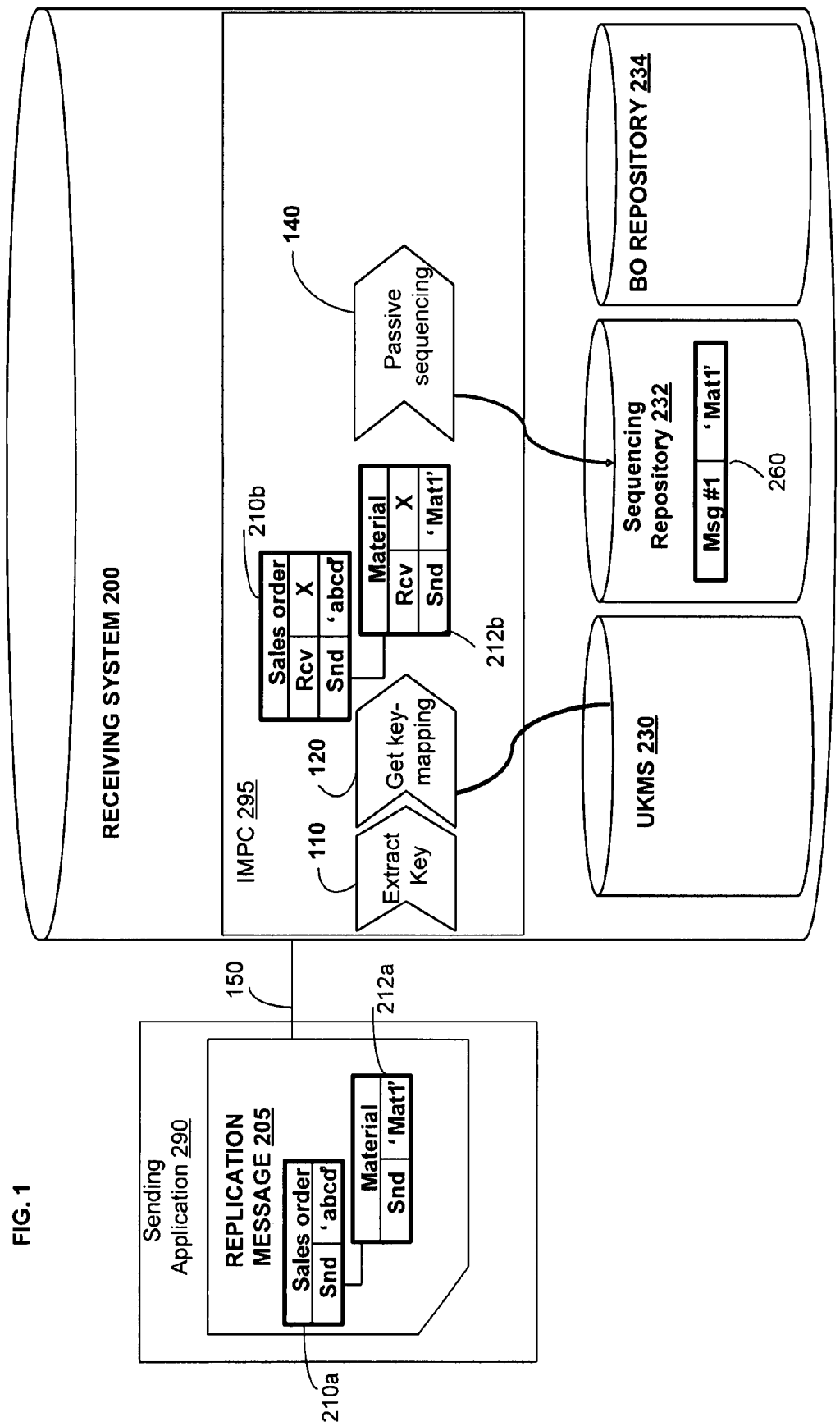
FIG. 1 depicts a block diagram of a system for processing messages in which message processing is inhibited.

Like labels are used to refer to same or similar items in the drawings.

DETAILED DESCRIPTION

This subject matter described herein relates to structured data, and, more particularly, messaging mechanisms used to provide (e.g., replicate, send, exchange, and the like) to a system structured data, such as business objects. As noted above, the phrase "business object" refers to a data structure including at least one of data and related methods that can be used in connection with a business process or task. Although the subject matter described herein uses examples that refer to business objects, other data structures and/or objects may be used as well.

Figure 5:
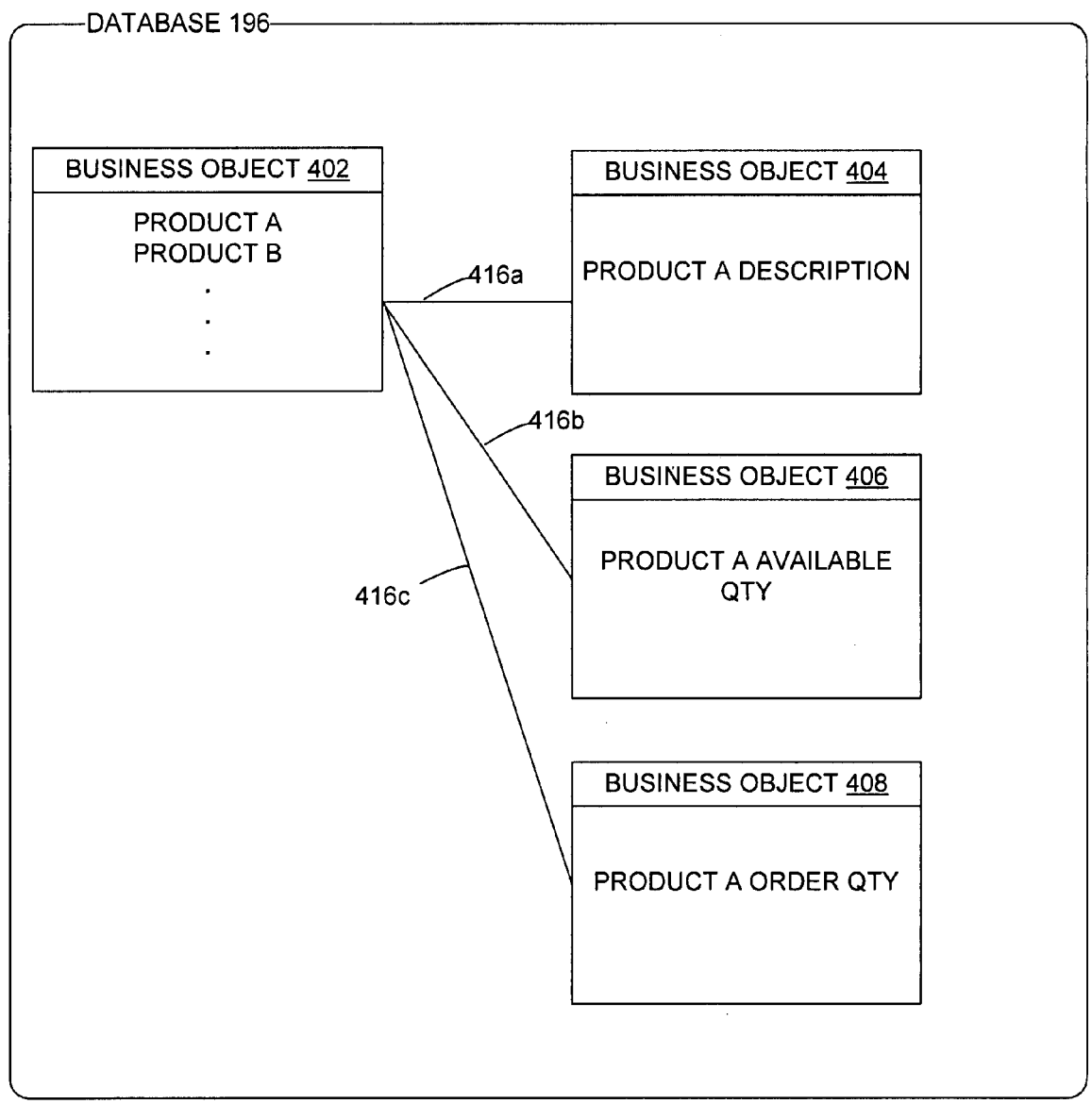
FIG. 5 is an example of an object, such as a business object.

When a system or application sends one or more business objects as messages without any form of serialization, the system or application receiving the business objects may receive them in an undefined order, without any prior knowledge regarding the identity of the business objects being sent, the structure of the business objects, and any dependencies and associations among the business objects. In some cases, successful processing of business objects may demand that the receiving system contain (e.g., in a repository) any dependent business objects before processing the business objects from which they depend on. Referring again to FIG. 5, before business object 402 can be processed at a receiving system, dependent business objects 404-408 must all be present in a repository at the receiving system. If the dependent objects are not present at the receiving systems, any messages containing the business object (e.g., business object 402) with references to other dependent business objects (e.g., business objects 402-408) may generate errors at the receiving system—often resulting in repeated restarts and/or errors until the dependent business objects are present at the receiving system. As a consequence, the restarts and errors may result in poor performance at the receiving system.

The above-described approach of repeatedly restarting until the dependent, business objects are received at a receiving system is referred to as "passive sequencing." To illustrate with another example, a sales order business object may reference a dependent material business object. In this example, before the receiving system can process (e.g., generate) a sales order using sales order business object, all of the materials (i.e., the dependent material business objects) in the sales order must be present (e.g., in a repository) at the receiving system. With passive sequencing, the receiving system rejects any messages containing the sales order business objects until it has all of the dependent material business objects. In contrast, active sequencing is integrated into the framework of the receiving system and includes inbound processing of messages to provide a mechanism that reduces the quantity of restarts at the receiving system and enables enhanced processing of a business objects and dependent business objects.

An application, such as a service or web service, may include one or more business objects. When that is the case, the application may send one or more messages to another application to initiate replication of the business objects at the other application. For example, the replication may be part of a migration of business objects from a first application to a second application.

FIG. 1 depicts a sending application 290 sending a replication message 205 to a receiving system 200 through a network 150. The receiving system 200 further includes an inbound message processing component (IMPC) 295, a unified key mapping service (UKMS) 230, a sequencing repository 232, and a business object (BO) repository 234. The sending application 290 and the receiving system 200 may be implemented as any type of program including, for example, a database application, although other types of applications, services, business object applications (i.e., applications using and/or instantiating business objects) and web services may be used as well.

In some implementations, portions of receiving system 200 may be implemented as so-called "middleware" providing a framework of services including framework functions (or services) as well as functions implemented by a business object application. For example, receiving system 200 may be implemented as an enterprise services framework. The term "framework" refers to a group of interrelated programs. An enterprise services framework is a client-server architecture that includes services, such as web services. An example of an enterprise services framework is the Enterprise Services Framework, available from SAP, AG. Moreover, in some implementations, inbound message processing component 295 includes the aspects of extracting keys, getting keys, passive sequencing, business object updating, updating key mapping information, and active sequencing, as described below (see, e.g., 110-168). In addition, in some implementations, a framework (e.g., an enterprise services framework) may be used to implement some aspects of inbound message processing component 295 (e.g., get key mapping, passive sequencing, update key mapping, and the like), while a business object application may implement other aspects, such as extracting keys at 110 or updating the business object, as described below at 160.

The replication message 205 includes business objects 210a and 212a. The business object 210a depicted is a "Sales order" business object including sender (labeled "Snd") key mapping information of "abcd." The sales order business object 210a references (e.g., depends on the presence of) dependent business object 212a, which is depicted as "Material" business object 212a including sender key mapping information of "Mat1." The sender key mapping information identifies each of the business objects at the application (or system) that sent message 205, while the receiver key mapping information identifies business objects at the application (or system) receiving the message 205. For example, the sender key mapping information may identify a location at sending application 290 (e.g., a location in memory, a row of a database, a column of a database, or the like) corresponding to the business object.

When replication message 205 is received at receiving system 200, at 110, inbound message processing component 295 extracts keys from business objects included in replication message 205. In the example of FIG. 1, the sender key "abcd" and "Mat1" are extracted from business objects 210a and 212a.

At 120, once the sender keys have been extracted, the key mapping information is retrieved from the UKMS 230. If receiver key mapping information is available in UKMS 230 for business objects 210a and 212a, the receiver key mapping information is returned. In the example of FIG. 1, the receiver key mapping information is not available in UKMS 230 for business objects 210a and 212a. FIG. 1 also depicts the lack of key mapping information (e.g., RCV "X" at key mapping information 210b and 212b).

In the example of FIG. 1, replication message 205 may be the first message sent to the receiving system 200 since UKMS 230 does not include any sender or receiver key mapping information. For both business objects 210a and 212a, inbound message processing component 295 reads key mapping information from UKMS 230. Using UKMS 230 and inbound message processing component 295 as a so-called "middleware" component may result in improved processing of messages when compared to passing messages, such as message 205, directly to a receiving application.

At 140, inbound message processing component 295 determines that sales order business object 210a references other dependent business objects, and thus sales order business object 210a requires material business object 212a to be present (e.g., persisted) at the receiving system 200 (also referred to as a "receiver") before sales order business object can be processed. At 140, there is, however, no information associated with material business object 212a in UKMS 230. An indication 260 is thus stored in sequencing repository 232 to indicate that information associated with material business object 212a is being sought by receiving system 200 to enable processing of replication message 205 (labeled "Msg #1"), so that a sales order may be generated.

Moreover, because sales order business object 210a cannot be processed without key mapping information 212b of the dependent material business object 212a, at 140 passive sequencing may inhibit processing of message 205 and the sales order business object-stopping the replication of the sales order business object at the receiving system. In some implementations, receiving system 200 may then buffer (e.g., store) message 205, and inhibit processing of message 205 until additional key mapping information 212b associated with referenced material business object 212a is received. While in other implementations, receiving system 200 may reject (e.g., discard) replication message 205, and inhibit processing of message 205 until additional key mapping information 212b—associated with referenced material business object 212a—is determined and received, at which time receiving system 205 waits for message 205 to be resent and resumes processing of message 205.

Figure 2:
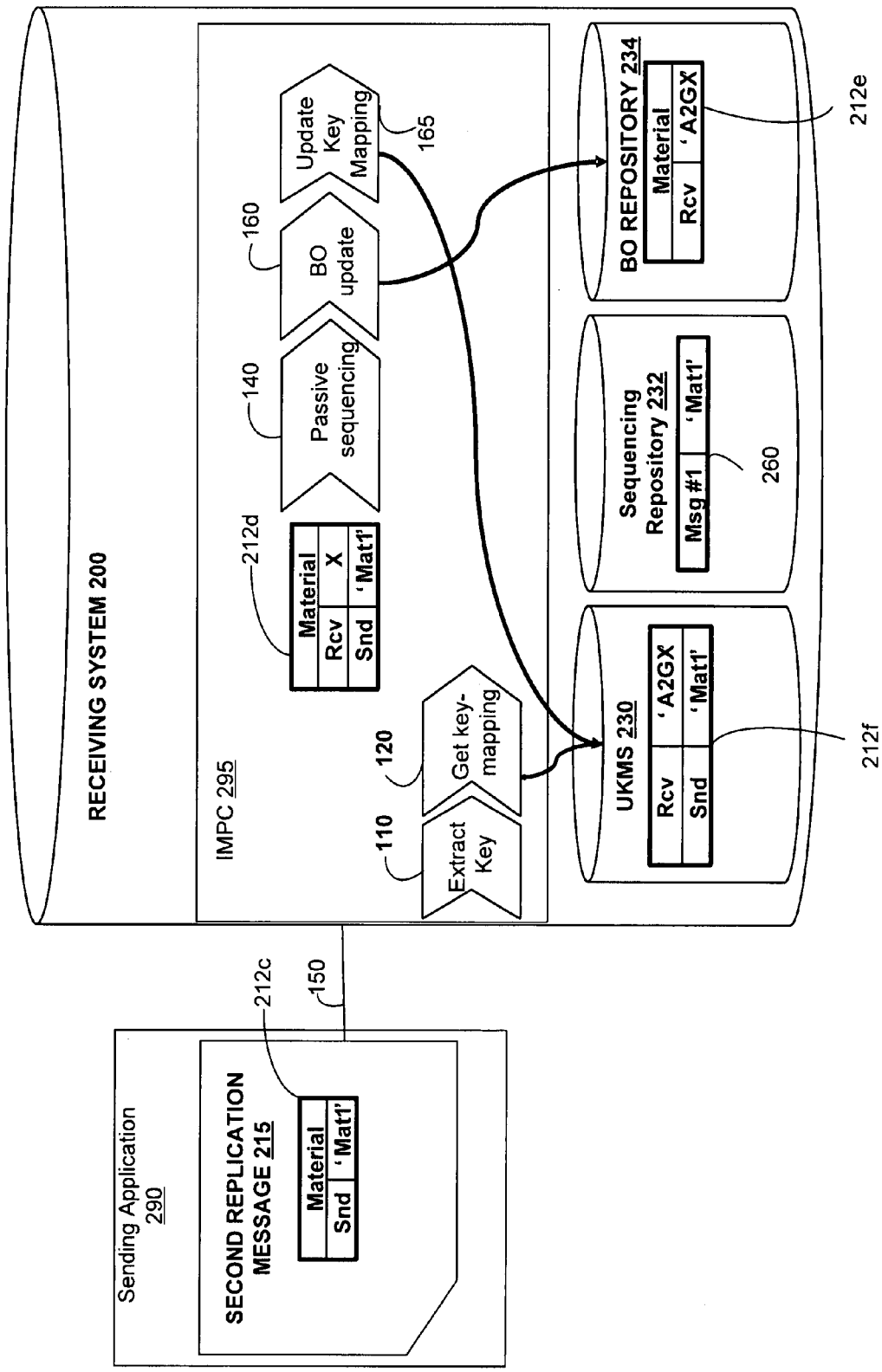
FIG. 2 depicts a block diagram system for processing messages when key mapping information is available at the receiver of the message.

FIG. 2 depicts sending application 290 sending another message, such as a second replication message 215, including a material business object 212c. When second message 215 is received at inbound message processing component 295, at 120, sender and receiver key mapping information for material business object 212c is retrieved. In the example of FIG. 2, only sender key mapping information (labeled "Snd" "Mat1" at 212d) is known from the extraction at 110 (i.e., "Extract Key" 110) since receiving system 200 has not yet determined receiver key mapping information (labeled as "Rcv" "X") for material business object 212c.

At 140, since material business object 212c does not have any dependencies, i.e., does not have any references to other business objects that depend from material business object 212c, passive sequencing 140 allows processing to continue of material business object 212c.

At 160, the material business object 212c is persisted by updating the business object repository 234. During the update of the business object repository 234, the receiver key mapping information for material business object 212c is determined. In the example of FIG. 2, a key "A2GX" is determined as the receiver key mapping information for material business object 212e. The receiver key mapping information may be determined by any application including a business object application associated with business objects 210a and 212a.

At 165, UKMS 230 receives the determined receiver key mapping information (e.g., "A2GX" as key mapping information in the receiving system) for material business object 212e and updates UKMS 230 to include receiver key mapping information (e.g., "A2GX") and the sender key mapping information (e.g., "Mat1" as key mapping information in the sending application and/or system) for material business object 212c. For material business object 212c, UKMS 230 thus includes receiver and sender key mapping information (e.g., "Mat1" for sending application 290 and "A2GX" for receiving system 200).

Figure 3A:
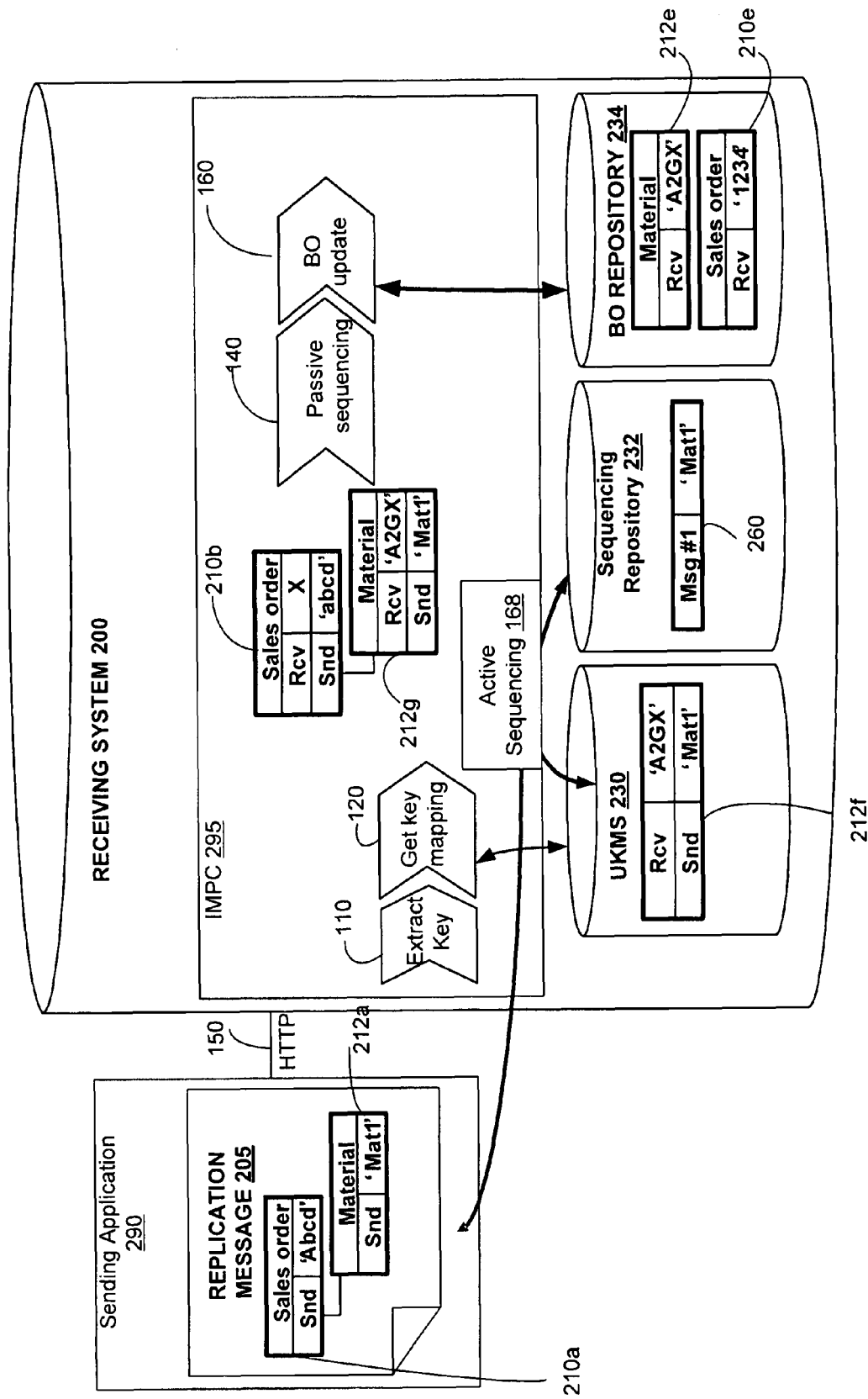
FIGS. 3a-3b depict resuming processing of messages.

FIG. 3a depicts additional processing at receiving system 200 and, in particular, active sequencing. Once the key mapping information for the material business object is received in UKMS 230, at 168, active sequencing activates a trigger for the resumption of processing of replication message 205. In some implementations, a trigger is created in sequencing repository 232 to indicate that processing of message 205 is being inhibited until the missing receiver key mapping information (e.g., "A2GX") for message 205 is received. When the trigger is activated by the receipt of the missing receiver key mapping information, receiving system 200 may retrieve replication message 205, which was buffered awaiting the resumption of processing. Alternatively, receiving system 200 may not buffer replication message 205 and wait for sending application 290 to resend replication message 205.

At 168, the activation of the trigger results in the resumption of processing of replication message 205. At 110, keys are extracted as described above. At 120, the key mapping information for the replication message 205 is retrieved from UKMS 230. The receiver and sender key mapping information is retrieved from UKMS 230 for material business object 212a (Rcv "A2GX" and Snd "Mat1"). Receiving system 200 does not yet include the receiver key mapping information for sales order business object 210a.

At 140, passive sequencing determines that all the referenced, dependent objects for sales order business object 210a are present (e.g., in UKMS 230), so that processing of sales order business object 210a may proceed.

At 160, business object repository 234 is updated to include sales order business object 210e. In the example of FIG. 3a, receiving application 295 determines receiver key "1234" for sales order business object 210e. The business object repository 234 of FIG. 3a depicts replicated business objects 210e and 212e at receiving system 200.

Figure 3B:
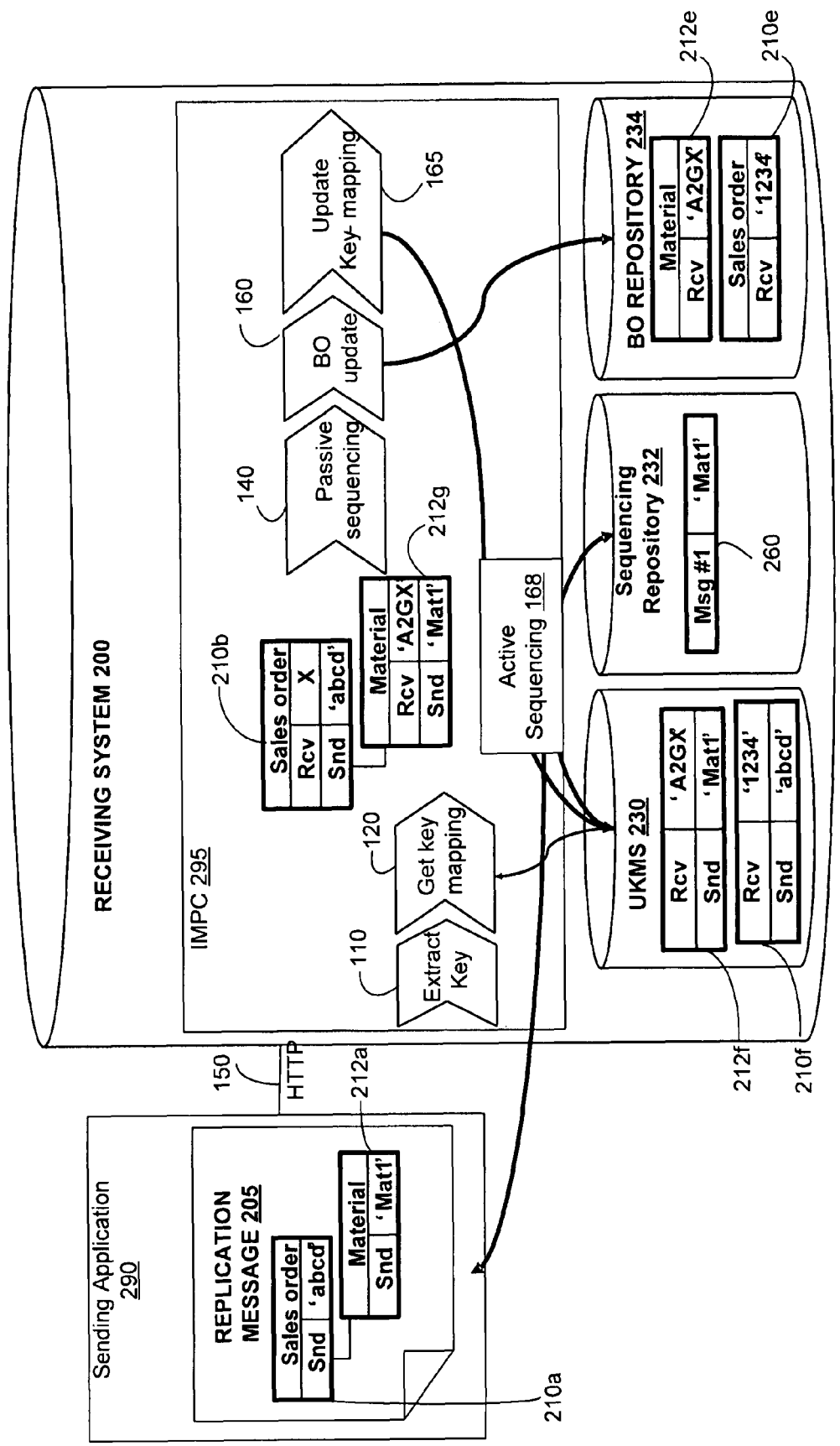

FIG. 3b depicts UKMS 230 updated at 165 to include receiver and sender key mapping information 210f for sales order business object 210a. FIG. 3b thus depicts the replication of business objects 210 and 212 at the receiving system 200. The replication of business objects 210 and 212 may enable the receiving application to utilize those business objects, when receiving application is invoked.

Figure 4:
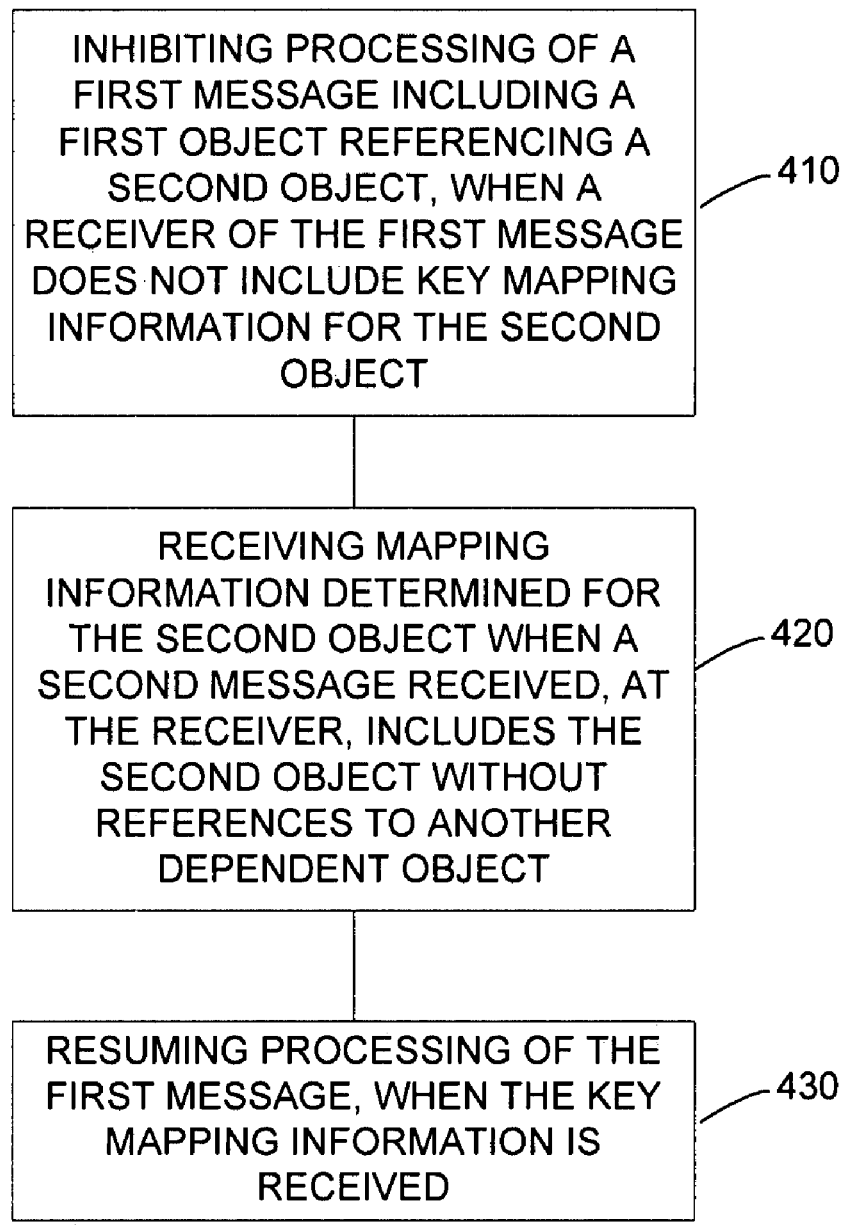
FIG. 4 is a flow diagram for processing messages.

FIG. 4 depicts a process for processing messages, such as messages 205 and 215. At 410, receiving system 200 inhibits processing of a message (e.g., message 205). The message may include a first business object (e.g., business object 210a) referencing a dependent, second business object (business object 212a). In some implementations, receiving system 200 may inhibit message processing of message 205 when receiving system 200 does not include key mapping information for the dependent, second business object. The lack of key mapping information for the dependent, second business object may represent that receiving system 200 does not include dependent, second business object.

At 420, receiving system may receive key mapping information determined for the dependent, second object. For example, when receiving system 200 receives a second message (e.g., message 215) including the dependent, second object, without reference to another dependent object, the receiver key mapping information may be determined. The receiver key mapping information represents a location of the dependent, second object at receiving system 200. Although the description above refers to message 215 as a second message, receiving system 200 may process and, in some cases, reject several—if not hundreds or thousands—of messages before the second message 215 is received.

At 430, receiving system 200 resumes processing of message 205, when receiver key mapping information for the dependent, second business object (e.g., material business object 212c) is received. The resumption of processing of message 205 enables business objects 210e and 212e to be replicated at receiving system 200, so that the receiving application can use the replicated business objects. For example, the receiving application may be a database application that generates sales orders including one or more material items.

Although the above describes replication of business objects, other objects and/or data structures may be used instead. Moreover, the active sequencing process described above may be used in applications other than the replication of business objects, data structures, and/or objects. For example, active sequencing may be used to send, receive, transfer, update, copy, and/or process business objects, data structures, and/or objects.

Moreover, although replication message 205 includes a structure of two business objects, other types of structures may be processed as described above. For example, replication message 205 may include sales order 210a, dependent material business object 212a, and another dependent business object, which depends from dependent material business object 212a. In this example, passive sequencing would inhibit processing of message 205 until key mapping information is received for the other dependent business object and the material business object 212a. Moreover, a message including material business object 212a may be inhibited until key mapping information is received for the other dependent business object. Thus, the above-described process may, in some implementations, provide enhanced replication of business objects.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A computer-readable medium containing instructions to configure a processor to perform a method, the method comprising:

receiving, at a receiving system from a sending application, a first message comprising a first object having a first dependency on a plurality of other objects, the plurality of other objects comprising a second object;

determining, by accessing a unified key mapping service at the receiving system, that second object key mapping information for the second object is not available at the receiving system because the second object has not yet been received at the receiving system when the first message is received at the receiving system;

inhibiting processing of the first message based on the determining, the inhibiting further comprising implementing the receiving system as middleware associated with a first application sending the first message and a second application, the second application accessing the first and second objects;

creating and storing, in a sequencing repository at the receiving system, a trigger indicating that processing of the first message is inhibited until the second object key mapping information is available;

receiving, at the receiving system, a second message comprising the second object, the second object having no second dependencies on other objects, the receiving of the second message further comprising determining, by the second application, the second object key mapping information, and storing the second object key mapping information in the unified key mapping service, the second object key mapping information comprising a location of the second object;

extracting, at the receiving system from the second message, the second object key mapping information, the extracting causing activation of the trigger; and resuming processing of the first message upon activation of the trigger, the resumed processing of the first message comprising extracting, from the first object, first object key mapping information for the first object;

processing the first object in accordance with the first message upon determination by the receiving system that all of the plurality of other objects are present at the receiving system.

2. The method of claim 1, wherein inhibiting further comprises:

storing the first message in a buffer at the receiving system until the processing of the first message is resumed.

3. The computer-readable medium of claim 1, wherein inhibiting further comprises:

implementing the first object at the receiving system as at least one of a business object and a data structure.

4. A computer-implemented method comprising:

receiving, at a receiving system from a sending application, a first message comprising a first object having a first dependency on a plurality of other objects, the plurality of other objects comprising a second object;

determining, by accessing a unified key mapping service at the receiving system, that second object key mapping information for the second object is not available at the receiving system because the second object has not yet been received at the receiving system when the first message is received at the receiving system;

inhibiting processing of the first message based on the determining, the inhibiting further comprising implementing the receiving system as middleware associated with a first application sending the first message and a second application, the second application accessing the first and second objects;

creating and storing, in a sequencing repository at the receiving system, a trigger indicating that processing of the first message is inhibited until the second object key mapping information is available;

receiving, at the receiving system, a second message comprising the second object, the second object having no second dependencies on other objects, the receiving of the second message further comprising determining, by the second application, the second object key mapping information, and storing the second object key mapping information in the unified key mapping service, the second object key mapping information comprising a location of the second object;

extracting, at the receiving system from the second message, the second object key mapping information, the extracting causing activation of the trigger; and resuming processing of the first message upon activation of the trigger, the resumed processing of the first message comprising extracting, from the first object, first object key mapping information for the first object;

processing the first object in accordance with the first message upon determination by the receiving system that all of the plurality of other objects are present at the receiving system.

5. The method of claim 4, wherein inhibiting further comprises:

storing the first message in a buffer at the receiving system until the processing of the first message is resumed.

6. The method of claim 4, wherein inhibiting further comprises:

implementing the first object at the receiving system as at least one of a business object and a data structure.

7. A system comprising:

a processor; and a memory storing instructions, that, when executed by the processor, cause the processor to perform operations comprising:

receiving, at a receiving system from a sending application, a first message comprising a first object having a first dependency on a plurality of other objects, the plurality of other objects comprising a second object;

determining, by accessing a unified key mapping service at the receiving system, that second object key mapping information for the second object is not available at the receiving system because the second object has not yet been received at the receiving system when the first message is received at the receiving system;

inhibiting processing of the first message based on the determining, the inhibiting further comprising implementing the receiving system as middleware associated with a first application sending the first message and a second application, the second application accessing the first and second objects;

creating and storing, in a sequencing repository at the receiving system, a trigger indicating that processing of the first message is inhibited until the second object key mapping information is available;

receiving, at the receiving system, a second message comprising the second object, the second object having no second dependencies on other objects, the receiving of the second message further comprising determining, by the second application, the second object key mapping information, and storing the second object key mapping information in the unified key mapping service, the second object key mapping information comprising a location of the second object;

extracting, at the receiving system from the second message, the second object key mapping information, the extracting causing activation of the trigger; and resuming processing of the first message upon activation of the trigger, the resumed processing of the first message comprising extracting, from the first object, first object key mapping information for the first object;

processing the first object in accordance with the first message upon determination by the receiving system that all of the plurality of other objects are present at the receiving system.

8. The system of claim 7, wherein inhibiting further comprises:

storing the first message in a buffer at the receiving system until the processing of the first message is resumed.

9. The system of claim 7, wherein inhibiting further comprises:

implementing the first object at the receiving system as at least one of a business object and a data structure.

* * * * *